(12) United States Patent
Zhu et al.

(10) Patent No.: US 10,283,816 B2
(45) Date of Patent: May 7, 2019

(54) ELECTRODE ASSEMBLY, AND LITHIUM ION ELECTRIC ROLL USING THE ELECTRODE ASSEMBLY

(71) Applicant: Dongguan Amperex Technology Limited, Dongguan, Guangdong Province (CN)

(72) Inventors: Junliang Zhu, Dongguan (CN); Haibing Wang, Dongguan (CN); Tongming Dong, Dongguan (CN); Wenqiang Cheng, Dongguan (CN); Baohua Chen, Dongguan (CN); Shufeng Wu, Dongguan (CN); Wei Yang, Dongguan (CN); Zhihua Qin, Dongguan (CN); Meina Lin, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 209 days.

(21) Appl. No.: 15/087,096

(22) Filed: Mar. 31, 2016

(65) Prior Publication Data

US 2017/0170524 A1 Jun. 15, 2017

(30) Foreign Application Priority Data

Dec. 14, 2015 (CN) .......................... 2015 1 0932557

(51) Int. Cl.
*H01M 10/0587* (2010.01)
*H01M 2/02* (2006.01)
(Continued)

(52) U.S. Cl.
CPC ..... *H01M 10/0587* (2013.01); *H01M 2/0267* (2013.01); *H01M 2/0285* (2013.01);
(Continued)

(58) Field of Classification Search
CPC ......... H01M 10/0587; H01M 10/0525; H01M 2/14; H01M 2/0285; H01M 2/0267; H01M 2220/30
See application file for complete search history.

(56) References Cited

U.S. PATENT DOCUMENTS

2014/0072850 A1* 3/2014 Kwon ............... H01M 10/0463
429/94
2015/0263323 A1* 9/2015 Kim ................... H01M 10/4235
429/133

FOREIGN PATENT DOCUMENTS

CN 201528017 U 7/2010
CN 202172092 U * 3/2012 .............. H01M 2/02
(Continued)

OTHER PUBLICATIONS

CN Office Action issued in corresponding Application No. 201510932557.3 dated Jun. 28, 2017 (12 pages).
(Continued)

*Primary Examiner* — Osei K Amponsah
(74) *Attorney, Agent, or Firm* — Carter, DeLuca & Farrell LLP

(57) ABSTRACT

The present application relates to the filed of an energy storage component, and in particular, relates to an electrode assembly, and a lithium ion electric roll using the electrode assembly. The electrode assembly comprises a bare electric roll and an anti-puncture cushion; wherein the bare electric roll comprises at least one electrode unit, the electrode unit comprising a cathode sheet, an anode sheet, and a separator, wherein the cathode sheet is isolated from the anode sheet by the separator; and the anti-puncture cushion is arranged on two sides along a width direction of the bare electric roll, and covers an edge of the anode sheet. A lithium ion electric roll comprises a laminated aluminum film and the electrode (Continued)

assembly, wherein the electrode assembly is wrapped by the laminated aluminum film.

11 Claims, 5 Drawing Sheets

(51) Int. Cl.
    *H01M 2/14* (2006.01)
    *H01M 10/0525* (2010.01)
(52) U.S. Cl.
    CPC ......... *H01M 2/14* (2013.01); *H01M 10/0525* (2013.01); *H01M 2220/30* (2013.01)

(56) References Cited

FOREIGN PATENT DOCUMENTS

| | | |
|---|---|---|
| CN | 203760574 U | 8/2014 |
| CN | 104425795 A | 3/2015 |

OTHER PUBLICATIONS

CN Office Action issued in corresponding Application No. 201510932557.3 dated Feb. 14, 2018.
CN Office Action issued in corresponding Application No. 201510932557.3 dated Sep. 12, 2018.

\* cited by examiner

ELECTRODE ASSEMBLY, AND LITHIUM ION ELECTRIC ROLL USING THE ELECTRODE ASSEMBLY

TECHNICAL FIELD

The present application relates to the filed of energy storage devices, and in particular, relates to an electrode assembly, and a lithium ion electric roll using the electrode assembly.

BACKGROUND

With the development of science and technology, a variety of electronic products emerge and almost become an indispensable part in daily life. With advantages of high energy density, long cycle life, environmental friendliness and reproductivity, lithium ion batteries have been widely used in various electronic products.

Generally, lithium secondary batteries are formed through setting an electrode assembly and electrolyte in a battery shell, and sealing the battery shell. Electrode units used in the electrode assembly may be categorized into convolution (winding)-type electrode units, a lamination-type electrode units, and folding-type electrode units according to their structure.

In the related art, a polypropylene layer of a laminated aluminum film is generally used to isolate an anode current collector in an anode sheet. Since the requirements of energy density of an electric roll at the market become higher and higher, a thickness of the polypropylene layer of the laminated aluminum film, and a thickness of the anode current collector become smaller. In one aspect, an anti-puncture strength of the thinned polypropylene layer becomes lower. In another aspect, since the anode current collector of the lithium ion battery is a copper foil, with the restriction of process conditions in the related art, burrs may exist on an end edge of the copper foil, which may cause the case where the burrs on the end edge of the anode puncture a separator and a laminated aluminum film under extreme conditions. However, in a lamination-type or stacking-type lithium ion electric roll, the edge of the thinned anode current collector will become sharper, which increases the probability that the polypropylene layer of the laminated aluminum film is punctured by the anode current collector.

After the polypropylene layer of the laminated aluminum film is punctured, which may cause battery leakage, and more seriously, may result in that the anode is conducted with the aluminum foil layer via contact. In this case, an electrochemical reaction may occur and thus the polypropylene layer of the laminated aluminum film may be subjected to corrosion, which also causes battery leakage and corrosion.

SUMMARY

The present application provides an electrode assembly, and a lithium ion electric roll using the electrode assembly, which is capable of effectively reducing the probability that a packaged laminated aluminum film is punctured by a pole sheet. A first aspect of the present application provides an electrode assembly, comprising a bare electric roll and an anti-puncture cushion; wherein the bare electric roll comprises at least one electrode unit, the electrode unit comprising a cathode sheet, an anode sheet, and a separator, wherein the cathode sheet is isolated from the anode sheet by the separator; and the anti-puncture cushion is arranged on two sides along a width direction of the bare electric roll, and covers an edge of the anode sheet.

Preferably, the bare electric roll comprises a plurality of electrode units, the plurality of electrode units being sequentially arranged in a stacking manner along a thickness direction, and the anode sheet in each of the plurality of electrode units being covered by the anti-puncture cushion.

Preferably, the anti-puncture cushion along a top and/or bottom direction of the bare electric roll exceeds the anode sheet.

Preferably, in the bare electric roll, a rib structure is formed on two sides or on one side along the width direction of the bear electric roll by at least one group of two adjacent electrode units, and the anti-puncture cushion further wraps the rib structure.

Preferably, the widths of the adjacent electrode units are different.

Preferably, the adjacent electrode units are partially staggered along a width direction.

Preferably, the electrode units comprise one or more of: lamination-type electrode units, convolution-type electrode units, and folding-type electrode units.

Preferably, the anti-puncture cushion is adhered on two sides along the width direction of the bare electric roll, and completely wraps two sides of the bare electric roll.

Preferably, the anti-puncture cushion is a tape.

A second aspect of the present application provides a lithium ion electric roll, comprising a laminated aluminum film, and the above mentioned electrode assembly, wherein the electrode assembly is wrapped by the laminated aluminum film.

The technical solutions provided in the present application may achieve the following beneficial effects:

An lithium ion electric roll according to the present application is capable of increasing a layer of protection isolation structure between an anode current collector and a laminated aluminum film by using an anti-puncture cushion which is arranged on outer side of the anode current collector and is arranged on two sides of a bare electric roll, which significantly lowers the probability of that the laminated aluminum film is punctured by a pole sheet.

It shall be appreciated that the above general description and the detailed description hereinafter are only illustrative but not for limiting the present application.

REFERENCE NUMERALS AND DENOTATIONS THEREOF

1—Electrode assembly
10—Bare electric roll
100—Electrode unit
100a—Cathode sheet
100b—Anode sheet
100c—Separator
100d—Rib structure
12—Anti-puncture cushion
2—Laminated aluminum film The accompanying drawings herein, which are incorporated into and constitute a part of the specification, illustrate embodiments consistent with the present application, and together with the specification, serve to explain the principles of the present application.

DETAILED DESCRIPTION

The present application is further described with reference to specific embodiments and accompanying drawings. The terms "front", "behind", "left", "right", "upper" and "lower" described in the present application are given with reference to the state where a lithium ion electric roll is disposed in the accompanying drawings.

Figure 1:
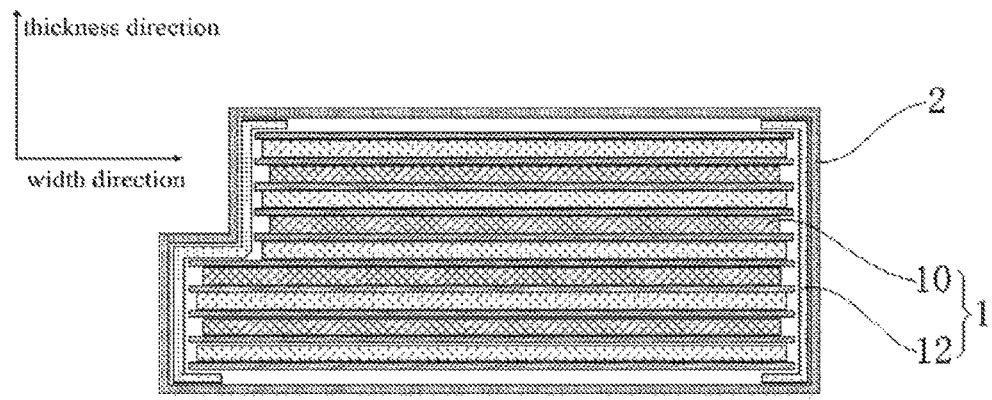
FIG. 1 is a schematic diagram of an integral structure of a lithium ion battery according to the present application.
Figure 2:
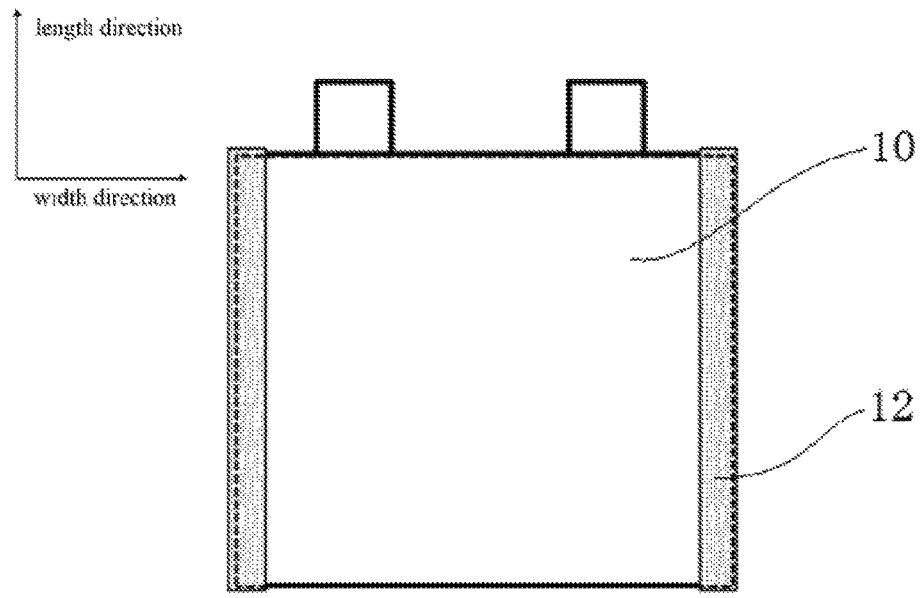
FIG. 2 is a schematic diagram of an exterior structure of an electrode assembly formed by a single lamination-type electrode unit according to the present application.
Figure 4:
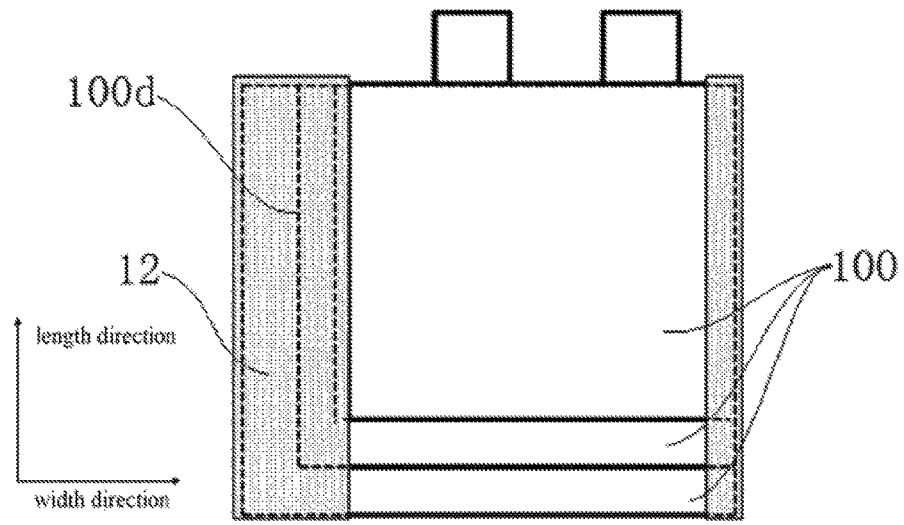
FIG. 4 is a schematic diagram of an exterior structure of an electrode assembly formed by a plurality of lamination-type electrode units according to the present application.
Figure 6:
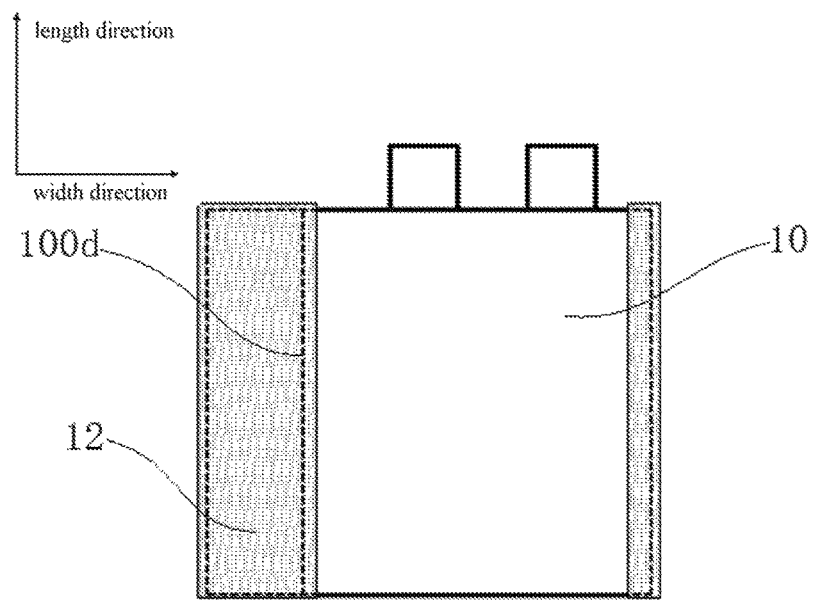
FIG. 6 is a schematic diagram of an exterior structure of an electrode assembly formed by a plurality of convolution-type electrode units according to the present application.

As illustrated in FIG. 1, a lithium ion electric roll is provided according to an embodiment of the present application, wherein the lithium ion electric roll comprises an electrode assembly 1 and a laminated aluminum film 2. As illustrated in FIG. 2, the electrode assembly 1 comprises a bare electric roll 10 and an anti-puncture cushion 12; wherein the bare electric roll 10 is a main electric energy generating component of the lithium ion electric roll, and generally comprises at least one electrode unit 100, each electrode unit 100 including a cathode sheet 100a, an anode sheet 100b, and a separator 100c; wherein the cathode sheet 100a is isolated from the anode sheet 100b by the separator 100c, such that the cathode sheet 100a and the anode sheet 100b may be subjected to an electrochemical reaction under the effect of an electrolyte. The anti-puncture cushion 12 is arranged on two sides along a width direction of the bare electric roll 10 (extending leftward and rightward along the paper surface in FIG. 2), and covers an edge of the anode sheet 100b. Finally, the electrode assembly 1 is entirely wrapped by the laminated aluminum film 2 from the outer side. In this case, the anti-puncture cushion 12 may serve as a barrier between the laminated aluminum film 2 and the anode sheet 100b. With the protection isolation structure, the anode sheet 100b may be isolated by the anti-puncture cushion 12, and thus fails to be in direct contact with the laminated aluminum film 2, thereby reducing the probability that the laminated aluminum film 2 is punctured (referring to FIG. 1). The corners on the top and at the bottom of the anode sheet 100b are sharp, and a polypropylene layer of the laminated aluminum film 2 may be possibly punctured by the anode sheet 100b along the top or bottom direction in the case where the anode sheet 100b along a width direction is covered by the anti-puncture cushion 12. In this case, this embodiment provides a corresponding protection measure to the polypropylene layer of the laminated aluminum film 2. To be specific, as illustrated in FIGS. 2, 4, and 6, in this embodiment, an edge of the anti-puncture cushion 12 along a top and/or bottom direction of the bare electric roll 10 exceeds the anode sheet 100b. In this way, after the electrode assembly 1 is wrapped by the laminated aluminum film 2, the portion exceeding the anode sheet 100b of the edge of the anti-puncture cushion 12 can be bent, such that the corners of the anode sheet 100b are completely wrapped by the anti-puncture cushion 12, thereby preventing polypropylene layer from piercing by the corners.

Considering manufacture difficulty, electric roll capacity and the like, preferably, a plurality of electrode units 100 are simultaneously used for the bare electric roll 10, and these electrode units are sequentially arranged in a stacking manner along a thickness direction. To ensure that the anode sheet 100b in each of the electrode units 100 is isolated from the laminated aluminum film 2, the anode sheet 100b in each of the electrode units 100 needs to be covered by the anti-puncture cushion 12.

Figure 7:
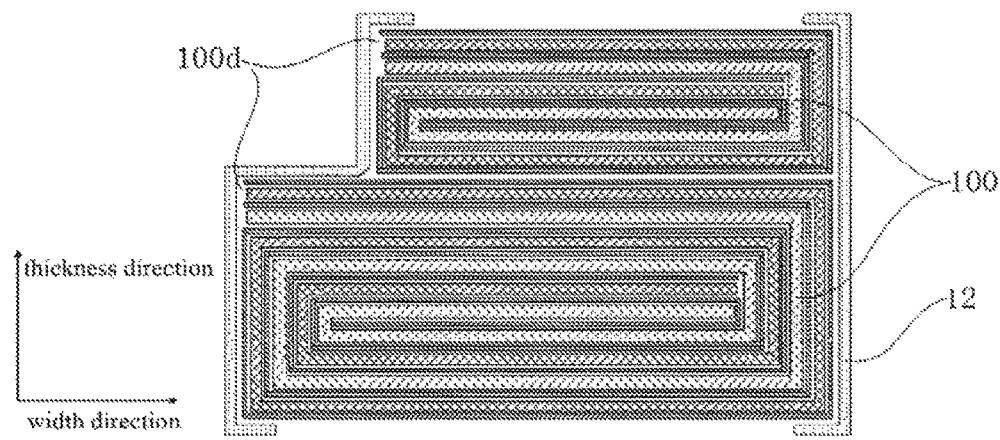
FIG. 7 is a schematic structural diagram of a cross section of FIG. 6.
Figure 10:
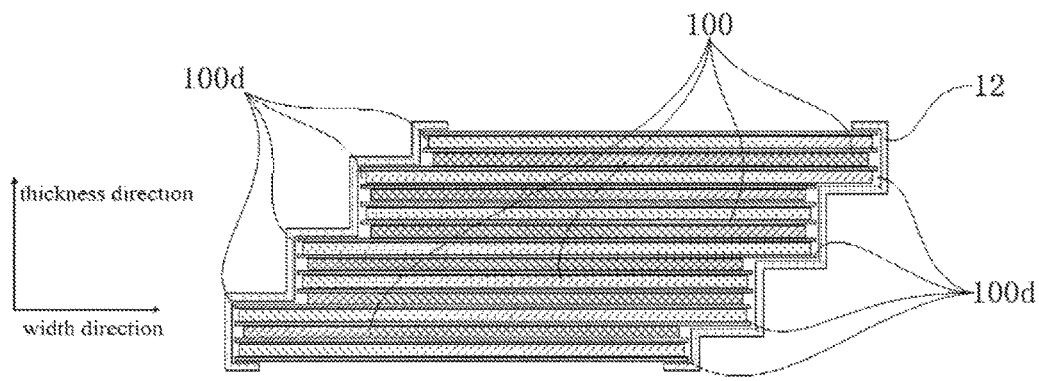
FIG. 10 is a schematic diagram illustrating partially staggering of adjacent electrode units along a width direction according to the present application.

The thicknesses of the electrode units 100 may be different, and meanwhile, the area vertical to a thickness direction may be adjusted according to the capacity of the electric roll, or regional spatial structure and volume desired for accommodating the electric roll. For example, the widths of two adjacent electrode units 100 are different (as illustrated in FIG. 7); or for another example, as illustrated in FIG. 10, the widths of four electrode units 100 are the same, but the thicknesses thereof are different. When the electrode units 100 are arranged in a stacking manner, electrode units 100 in each layer relative to the lower electrode units 100 are partially staggered rightward along a width direction. Nevertheless, there is more complicated situation, for example, size difference still exists in the plurality of electrode units 100 along a length direction (extending in a direction vertical to the paper surface in FIG. 10); or, the plurality of electrode units 100 are partially staggered, which is not described herein any further.

When the above case occurs, a rib structure 100d is formed on two sides or on one side along a width direction of the two adjacent electrode units 100. Since an edge of the rib structure 100d projects outwards and is sharp, the polypropylene layer of the laminated aluminum film 2 is easily punctured. In order to cope with this situation, the rib structure 100d is clad with the anti-puncture cushion 12 in this embodiment.

Figure 3:
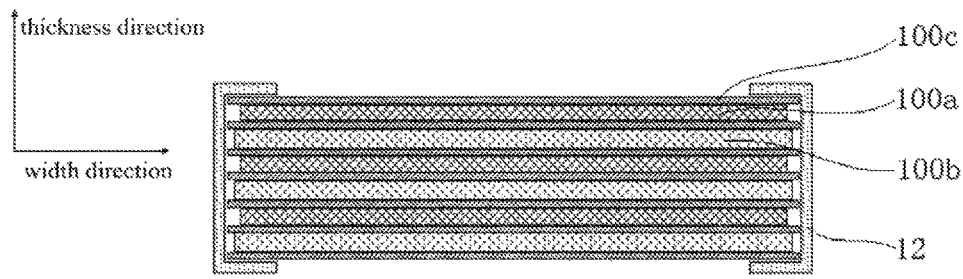
FIG. 3 is a schematic structural diagram of a cross section of FIG. 2.
Figure 5:
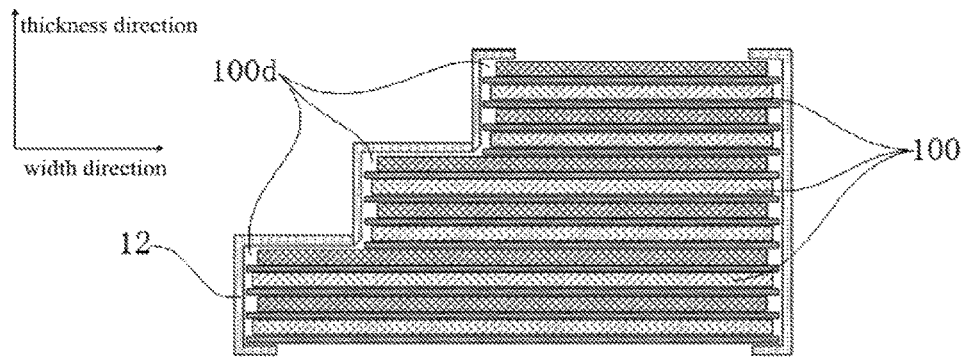
FIG. 5 is a schematic structural diagram of a cross section of FIG. 4.
Figure 8:
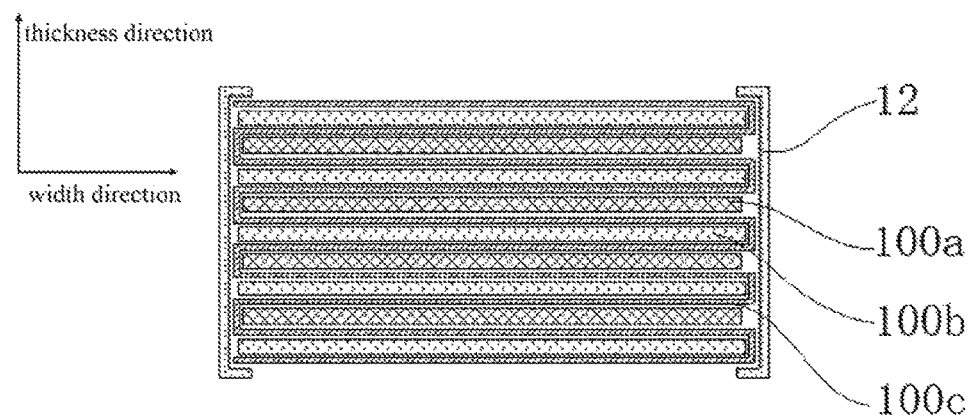
FIG. 8 is a schematic diagram of an exterior structure of an electrode assembly of a single folding-type electrode unit according to the present application.

In this embodiment, the electrode unit 100 may employ various types, such as, lamination type, convolution type, a folding type, and the like. For example, the electrode assembly 1 as illustrated in FIGS. 2 and 3 only comprises lamination-type electrode units 100. In the electrode unit 100, the cathode sheet 100a, the separator 100c, and the anode sheet 100b are alternately stacked. However, the electrode assembly 1 as illustrated in FIGS. 4 and 5 comprises three lamination-type electrode units 100 with the lengths and widths sequentially decreasing. For another example, the electrode assembly 1 as illustrated in FIGS. 6 and 7 comprises convolution-type electrode units 100 with the lengths and widths sequentially decreasing, such that the bare electric roll 10 forms an edge structure similar to a step-like shape. Still for another example, the electrode assembly 1 as illustrated in FIG. 8, the cathode sheet 100a and the anode sheet 100b are arranged in a stacking manner, and the separators 100c may serve as barriers sequentially between the adjacent cathode sheet 100*a* and the anode sheet 100*b* in a folding manner, to form the folding-type electrode units.

Figure 9:
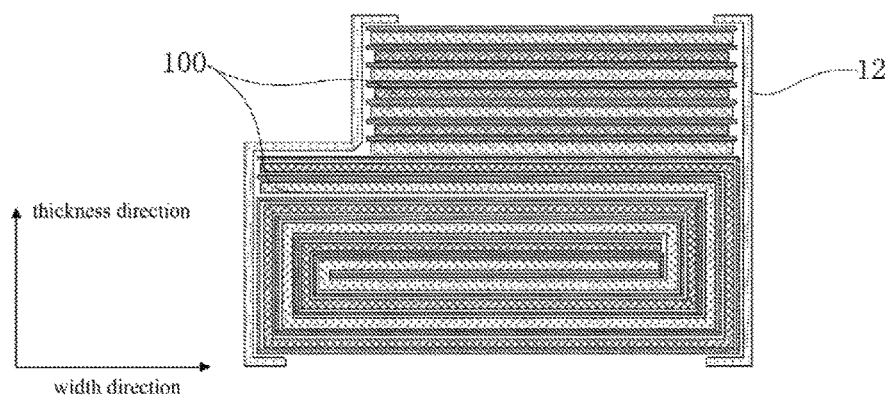
FIG. 9 is a schematic diagram of an exterior structure formed by hybrid stacking of a plurality of types of electrode units according to the present application.

In addition, when a plurality of electrode units 100 simultaneously are used in one bare electric roll 10, each of the plurality of electrode units 100 may select different types according to actual requirements. For example, the electrode assembly 1 as illustrated in FIG. 9 comprises one lamination-type electrode unit 100 with a smaller width, and one convolution-type electrode unit 100 with a greater width. The right sides of two electrode units 100 are aligned.

In this embodiment, the anti-puncture cushion 12 may be divided into multiple sections, for example, an upper section, and a lower section, or several sections in a parallel arrangement along the thickness direction; wherein each section of the anti-puncture cushion 12 is separately adhered on two sides along the width direction of the bare electric roll. Or, each section of the anti-puncture cushion 12 is directly adhered on two sides along the width direction of the bare electric roll 1, and completely warps the two sides of the bare electric roll 10. In this manner, the anode sheet 100*b* and the rib structure 100*d* may be all covered together, and compared with the multi-section process, this process is simple and easy to operate. A viscous tape may be directly selected for the anti-puncture cushion 12. For example, a biaxially oriented polypropylene (BOPP) tape which is commonly used on the lithium ion battery is selected, for example, a green glue commonly known.

The probability that the laminated aluminum film 2 is punctured by the anode current collector of the anode sheet is significantly reduced by the lithium ion electric roll according to this embodiment.

Described above are merely preferred embodiments of the present application, but are not intended to limit the present application. A person skilled in the art may derive various modifications and variations. Any modification, equivalent replacement, or improvement made without departing from the spirit and principle of the present application should fall within the protection scope of the present application.

What is claimed is:

1. An electrode assembly, comprising:
a bare electric roll including a top portion formed at a terminal side thereof, a bottom portion formed at a side of the bare electric roll opposite to the terminal side, two first surfaces extending along a width direction and a length direction of the bare electric roll, and two second surfaces extending along a thickness direction and the length direction of the bare electric roll; and
an anti-puncture cushion,
wherein the bare electric roll comprises at least one electrode unit, the electrode unit comprising a cathode sheet, an anode sheet, and a separator, wherein the cathode sheet is isolated from the anode sheet by the separator,
wherein the anti-puncture cushion is arranged on each of the two second surfaces and extends to the two first surfaces, and covers an edge of the anode sheet, and
wherein an edge of the anti-puncture cushion exceeds the bottom portion of the anode sheet.

2. The electrode assembly according to claim 1, wherein the bare electric roll comprises a plurality of electrode units, the plurality of electrode units being sequentially arranged in a stacking manner along a thickness direction, and the anode sheet in each of the plurality of electrode units being covered by the anti-puncture cushion.

3. The electrode assembly according to claim 2, wherein an edge of the anti-puncture cushion along a top direction of the bare electric roll exceeds the anode sheet.

4. The electrode assembly according to claim 2, wherein in the bare electric roll, a rib structure is formed on two sides or on one side along the width direction of the bear electric roll by at least one group of two adjacent electrode units, and the anti-puncture cushion further wraps the rib structure.

5. The electrode assembly according to claim 4, wherein the widths of the adjacent electrode units are different.

6. The electrode assembly according to claim 4, wherein the adjacent electrode units are partially staggered along a width direction.

7. The electrode assembly according to claim 4, wherein the electrode units comprise one or more of: lamination-type electrode units, convolution-type electrode units, and folding-type electrode units.

8. The electrode assembly according to claim 4, wherein the anti-puncture cushion is adhered on two sides along the width direction of the bare electric roll, and completely wraps two sides of the bare electric roll.

9. The electrode assembly according to claim 8, wherein the anti-puncture cushion is a tape.

10. A lithium ion electric roll, comprising a laminated aluminum film and the electrode assembly according to claim 1, wherein the electrode assembly is wrapped by the laminated aluminum film.

11. The electrode assembly according to claim 1, wherein the portion of the edge of the anti-puncture cushion, exceeding the bottom portion of the anode sheet, is bendable, and corners of the anode sheet are completely wrapped by the anti-puncture cushion.

* * * * *